US012716991B2

(12) United States Patent
Pandharipande et al.

(10) Patent No.: US 12,716,991 B2
(45) Date of Patent: Aug. 25, 2026

(54) TRANSMIT POWER CONTROL FOR AUTOMOTIVE RADAR SENSING

(71) Applicant: NXP B.V., Eindhoven (NL)

(72) Inventors: Ashish Pandharipande, Eindhoven (NL); Jeroen Overdevest, Eindhoven (NL)

(73) Assignee: NXP B.V., Eindhoven (NL)

( * ) Notice: Subject to any disclaimer, the term of this patent is extended or adjusted under 35 U.S.C. 154(b) by 345 days.

(21) Appl. No.: 18/378,345

(22) Filed: Oct. 10, 2023

(65) Prior Publication Data

US 2025/0116754 A1 Apr. 10, 2025

(51) Int. Cl.
*G01S 7/35* (2006.01)
*G01S 13/931* (2020.01)

(52) U.S. Cl.
CPC .............. *G01S 7/35* (2013.01); *G01S 13/931* (2013.01)

(58) Field of Classification Search
CPC .......... G01S 7/35; G01S 13/931; G01S 7/023; G01S 13/58; G01S 7/4013; G01S 7/2883
See application file for complete search history.

(56) References Cited

U.S. PATENT DOCUMENTS 8,902,103 B2 * 12/2014 Kim ...................... G01S 13/345 342/134
10,775,478 B2 9/2020 Davis et al.
11,287,513 B2 3/2022 Vermersch et al.
11,294,030 B2 * 4/2022 Longman ................ G01S 7/352
2003/0030583 A1 * 2/2003 Finn ...................... B60R 21/013 342/72
2006/0109170 A1 5/2006 Voigtlaender et al.
2008/0266169 A1 * 10/2008 Akita .................... G01S 13/931 342/117
2013/0241763 A1 * 9/2013 Kawabe .................. G01S 13/34 342/87
2020/0100192 A1 * 3/2020 Rao ..................... H04W 52/247
2020/0103498 A1 * 4/2020 Frank ...................... G01S 7/411
2023/0047234 A1 2/2023 Koch et al.

OTHER PUBLICATIONS

Yu et al., "Distributed Multiuser Power Control for Digital Subscriber Lines", IEEE Journal on Selected Areas in Communications, Jun. 2002, pp. 1105-1115, vol. 20, No. 5, IEEE, Stanford, CA.
Kivanc et al., "Computationally Efficient Bandwidth Allocation and Power Control for OFDMA", Nov. 2003, pp. 1150-1158, IEEE Transactions on Wireless Communications, vol. 2, No. 6, IEEE, Seattle, WA.

* cited by examiner

*Primary Examiner* — Yonghong Li

(57) ABSTRACT

A system and method are presented. A plurality of target objects are determined by a radar system. Each target object in the plurality of target objects is associated with a distance value and a velocity value. A power reduction factor is determined using the distance value and the velocity value associated with each target object of the plurality of target objects. A second radar signal is transmitted at a second power level determined by the power reduction factor.

20 Claims, 5 Drawing Sheets

TRANSMIT POWER CONTROL FOR AUTOMOTIVE RADAR SENSING

TECHNICAL FIELD

The present disclosure is directed in general to radar systems and associated methods of operation. In one aspect, the present disclosure relates to a radar system configured to modulate a power level of an output signal, which can reduce power consumption and inter-radar system interference.

BACKGROUND

A radar system transmits an electromagnetic signal and receives back reflections of the transmitted signal. The time delay and/or time delay variation between the transmitted and received signals can be determined and used to calculate the distance and/or the speed of objects causing the reflections, respectively. For example, in automotive applications, automotive radar systems can be used to determine the distance and/or the speed of oncoming vehicles and other obstacles.

Automotive radar systems enable the implementation of advanced driver-assistance system (ADAS) functions that are likely to enable increasingly safe driving and, eventually, fully autonomous driving platforms. Such systems use radar systems as the primary sensor for ADAS operations.

Existing radar systems are configured to transmit radar signals at a fixed and maximal power level to support the detection of objects at a maximum range of interest. In addition to increasing the power consumption of the radar sensor, a side-effect of this behavior is that it can result in elevated levels of radar-to-radar system interference.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
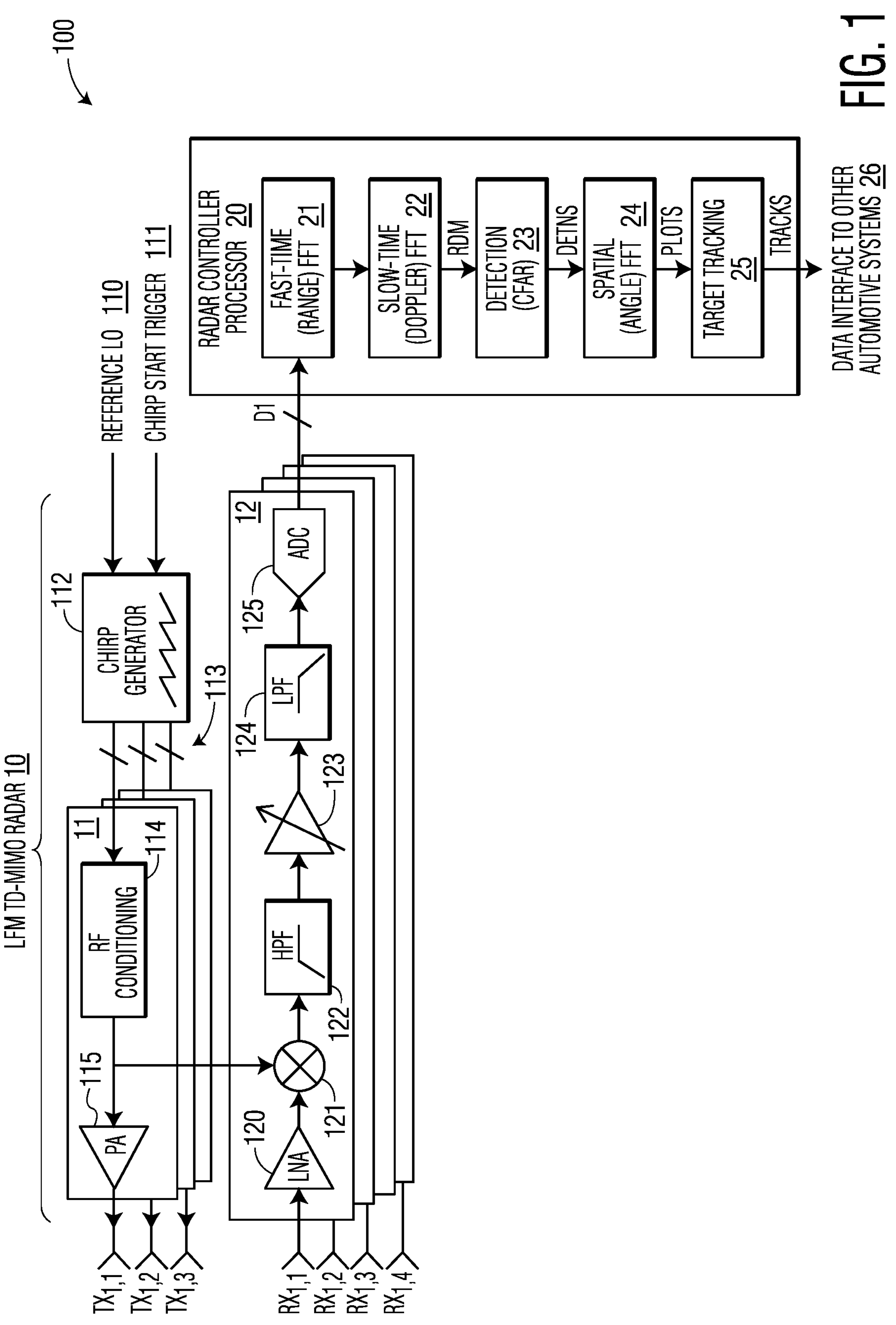
FIG. 1 depicts a simplified schematic block diagram of automotive radar system.

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

Automotive radar systems are used to support advanced driver-assistance system (ADAS) functions like assisted cruise control, emergency braking, and blind spot monitoring and alerts. For these ADAS applications, nearby objects that are detected by automotive radar systems are typically the most relevant. When executing emergency braking functions, for example, a nearby detected vehicle is more pertinent to the braking function than another vehicle that is a long way away.

In typical applications, conventional automotive radar systems are configured to transmit at maximum power levels to support object detection at the greatest possible object detection ranges (e.g., up to 200 m for long-range radars). As a consequence, existing automotive radar systems generally operate at maximum (or very high) power consumption levels. If all automotive radar systems in a particular geographical region (e.g., within a parking lot or on a particular section of road) are transmitting radar signal at maximum power levels, there is a significantly increased likelihood of system-to-system signal interference.

The present disclosure provides an automotive radar system and method that mitigates these deficiencies in existing automotive radar systems by providing an adaptive power control method for automotive radar systems.

In the context of the present disclosure, it will be appreciated that radar systems may be used as sensors in a variety of different applications, including but not limited to automotive radar sensors for road safety and vehicle control systems, such as advanced driver-assistance systems (ADAS) and autonomous driving (AD) systems.

In such applications, the radar systems are used to measure the radial distance to a reflecting object, its relative radial velocity, and angle information, and are characterized by performance criteria, such as the angular resolution (the minimum distance between two equal large targets at the same range and range rate (or radial velocity) resolution cell which a radar is able to distinguish and separate to each other), sensitivity, false detection rate, and the like.

Typically, frequency modulated continuous wave (FMCW) modulation radars are used to identify the distance, velocity, and/or angle of a radar target, such as a car or pedestrian, by transmitting Linear Frequency Modulation (LFM) waveforms from transmit antennas so that reflected signals from the radar target are received at receive antennas and processed to determine the radial distance, relative radial velocity, and angle (or direction) for the radar target.

To illustrate the design and operation of a radar system configured in accordance with the present disclosure, reference is now made to FIG. 1 which depicts a simplified schematic block diagram of automotive radar system 100. Automotive radar system 100 includes MIMO radar device 10 connected to a radar controller processor 20. In selected embodiments, MIMO radar device 10 may be embodied as a line-replaceable unit (LRU) or modular component that is designed to be replaced quickly at an operating location. Similarly, the radar controller processor 20 may be embodied as a line-replaceable unit (LRU) or modular component. Although a single or mono-static MIMO radar device 10 is shown, it will be appreciated that additional distributed radar devices may be used to form a distributed or multi-static radar. In addition, the depicted radar system 100 may be implemented in integrated circuit form with the LFM MIMO radar device 10 and the radar controller processor 20 formed with separate integrated circuits or chips or with a single chip, depending on the application.

Each radar device 10 includes one or more transmitting antenna elements TXi and receiving antenna elements RXj connected, respectively, to one or more radio frequency (RF) transmitter (TX) units 11 and receiver (RX) units 12. For example, each radar device (e.g., 10) is shown as including individual antenna elements (e.g., TX1,*i*, RX1,*j*) connected, respectively, to three transmitter modules (e.g., 11) and four receiver modules (e.g., 12), but these numbers are not limiting and other numbers are also possible, such as four transmitter modules 11 and six receiver modules 12, or a single transmitter module 11 and/or a single receiver modules 12.

Each radar device 10 also includes a chirp generator 112 that is configured and connected to supply a chirp input signal to the transmitter modules 11. To this end, the chirp generator 112 is connected to receive a separate and independent local oscillator (LO) signal 110 and a chirp start trigger signal 111, though delays are likely to be different due to the signal path differences and programmable digital delay elements in the signal paths. Chirp signals 113 are generated and transmitted to multiple transmitters 11, usually following a pre-defined transmission schedule, where they are filtered at the RF conditioning module 114 and amplified at the power amplifier 115 before being fed to the corresponding transmit antenna TX1,*i* and radiated. By sequentially using each transmit antenna TX1,*i* to transmit successive pulses in the chirp signal 113, each transmitter element 11 operates in a time-multiplexed fashion in relation to other transmitter elements because they are programmed to transmit identical waveforms on a temporally separated schedule.

The radar signal transmitted by the transmitter antenna unit TX1,*i*, TX2,*i* may be reflected by an object, and part of the reflected radar signal reaches the receiver antenna units RX1,*i* at the radar device 10. At each receiver module 12, the received (radio frequency) antenna signal is amplified by a low noise amplifier (LNA) 120 and then fed to a mixer 121 where it is mixed with the transmitted chirp signal generated by the RF conditioning module 114. The resulting intermediate frequency signal is fed to a first high-pass filter (HPF) 122. The resulting filtered signal is fed to a first variable gain amplifier 123 which amplifies the signal before feeding it to a first low pass filter (LPF) 124. This re-filtered signal is fed to an analog/digital converter (ADC) 125 and is output by each receiver module 12 as a digital signal D1. In various embodiments, the receiver module compresses target echoes of various delay signals into multiple sinusoidal tones whose frequencies correspond to the round-trip delay of the echo.

The radar system 100 also includes a radar controller processing unit 20 that is connected to supply input control signals to the radar device 10 and to receive therefrom digital output signals generated by the receiver modules 12.

In selected embodiments, the radar controller processing unit 20 may be embodied as a micro-controller unit (MCU) or other processing unit that is configured and arranged for signal processing tasks such as, but not limited to, target identification, computation of target distance, target velocity, and target direction, and generating control signals. The radar controller processing unit 20 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences.

In addition, the radar controller processor 20 may be configured to program the modules 11 to operate in a time-division fashion by sequentially transmitting LFM chirps for coordinated communication between the transmit antennas TX1,*i*, RX1,*j*. The result of the digital processing at the radar controller processing unit 20 is that the digital domain signals D1 are processed for the subsequent fast-time range frequency Fourier transform (FFT) 21, slow-time FFT 22 for Doppler compression, constant false alarm rate (CFAR) target detection 23, spatial angle estimation 24, and target tracking processes 25, with the result being output 26 to other automotive computing or user interfacing devices for further process or display. When performing target detection, the radar controller processor 20 is configured to determine a profile (e.g., range, Doppler, azimuth angle, elevation angle and/or radar-cross section (rcs) profile) of the reflected radar signals, where peaks in the profile are indicative of potential targets at known ranges.

During operation of automotive radar system 100, radar controller processor 20 transmits control signals to the various components of one or more radio frequency (RF) transmitter (TX) units 11 and receiver (RX) units 12 to control how the radar signals transmitted by automotive radar system 100 are the transmitted signals are shaped and how the received signals are processed. In a specific example, radar controller processor 20 is configured to modulate the power level of signals transmitted by the one or more radio frequency (RF) transmitter (TX) units 11 by transmitting control signal to power amplifier 115 of each of the one or more radio frequency (RF) transmitter (TX) units 11.

In typical radar systems, radar signals are transmitted at a fixed power level that is selected to achieve object detection at the radar system's maximum range of interest. This generally requires that radar signals always be transmitted at maximum allowable power levels. In addition to increasing the power consumption of a conventional radar system, a side-effect of this behavior is an increased likelihood of radar-to-radar interference among surrounding vehicles that use similar time, frequency, and spatial resources. If multiple radar systems are operating at maximum power levels within a constrained location, the radar signals transmitted by one such radar system can overwhelm or otherwise interfere with the signals being received and processed by another nearby radar system.

In minimizing these deleterious effects, it is important to note that for a radar system providing ADAS functionality, it is generally true that accurate detection of nearby objects can be more relevant to ADAS operations than the detection of objects that are further away. For example, it is generally more important to detect a first object that is nearby the vehicle than a second object that is further away and may be in the same path as the first object. The ADAS system must take action with respect to the first object. At the same time, the further away second object may be irrelevant to the ADAS system's operations.

As such, the present disclosure provides a radar system including an adaptive power control mechanism that provides for detection of the closest objects in the environment. In a specific embodiment, the controller of the radar system (e.g., radar controller process 20 of FIG. 1) is configured to modulate the power level of transmitted radar signals (e.g., via modification of the operation of power amplifier 115 of FIG. 1) based upon an analysis of target objects detected in the vicinity of the radar system. In an embodiment, the power level of transmitted signals may be modulated based on object detection characteristics like the estimated range to detected objects and/or the velocity of detected objects in a current radar system sensing time slot.

In an embodiment of the present system, a radar system (e.g., automotive radar system 100 of FIG. 1) has a field-of-view (FOV) defined by radar signals being transmitted (e.g., by one or more radio frequency (RF) transmitter (TX) units 11 of FIG. 1) and received (e.g., by one or more radio frequency (RF) receiver (RX) units 12) by the radar system that covers a particular region of interest. During operations, the radar system operates according to a sensing interval $\Delta t$ that defines the duration between two radar waveform transmissions used to perform object detection by the radar system. With these attributes, the controller of the radar can implement a method for power modulation in accordance with this disclosure.

The example radar system 100 described above is presented in conjunction with a radar system 100 configured as an FMCW radar system. It should be understood that embodiments of the present system may be utilized in conjunction with the signals being received and processed by other types of radar systems to control the transmit power of such radar systems. For example, the radar signals processed in conjunction with the present system may be received by radar systems configured to process signals encoded by (bi-)phase modulated continuous wave (PMCW), orthogonal frequency division multiplexing (OFDM), or orthogonal time frequency space (OTFS) modulation scheme or any other types of radar systems configured to process received radar signals and process those signals to identify attributes of target objects in the vicinity (i.e., with a field of vision (FOV)) of the radar system based upon that processing.

Figure 2:
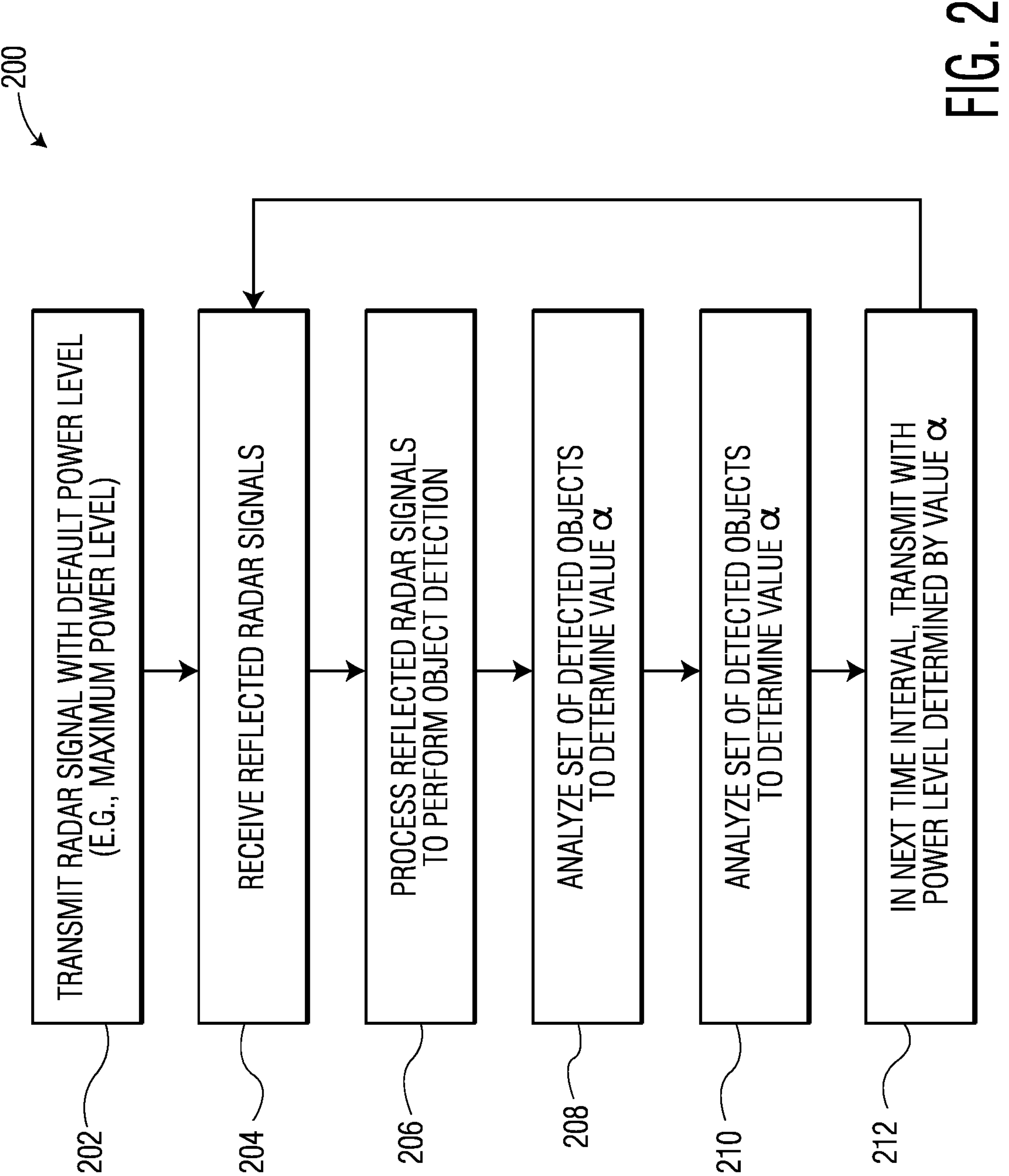
FIG. 2 is a flowchart depicting a method implemented by a controller of a radar system to provide adaptive power control of the radar system's transmitted signals.

FIG. 2 is a flowchart depicting method 200 that may be implemented by a controller of a radar system (e.g., radar controller processor 20 of automotive radar system 100 of FIG. 1) to provide adaptive power control of the radar system's signal transmitter (e.g., one or more radio frequency (RF) transmitter (TX) units 11 of FIG. 1).

In step 202, at an initial time to, the controller configures the power amplifier (e.g., power amplifier 115 of FIG. 1) to transmit a radar signal with a default power level $P_0$. In most applications, the default power level will be a maximum power level (i.e., $P_{max}$) at which the radar system is allowed to transmit radar signals. This is the radar system's default behavior because, by transmitting at maximum power, the radar system is configured to detect objects that are within the radar system's maximum range $R_{max}$.

In step 204, signals that include reflections of the radar signals transmitted in step 202 are received by the radar system (e.g., via one or more radio frequency (RF) receiver (RX) units 12). In step 206, those reflected signals are processed (e.g., via a sequence of Fourier transforms and other analysis) to identify a set of target objects from which the signals reflected. For each target object, a range and velocity is determined. As such, in step 206*a* data set is determined that includes K objects where each object is associated with a range and velocity value $R_K$ and $V_K$. In other embodiments, however, the range and velocity values could be generated by external database or retrieved from third party data sources that process movement data for a number of target objects in a particular geographical region. As such, in this step the distance values and the velocity values may be retrieved from a data source, rather than being generated via the processing of radar signal data.

In step 208, the set of objects identified in step 206 is further analyzed to determine a power reduction factor ($\alpha$) that is used to modulate the power level of signals transmitted by the radar system. Specifically, in step 208, the controller is configured to determine the value $\alpha i$ using the following equation:

$$\alpha_i = \frac{\min_j\{R_j(t_i) - v_j(t_i)\Delta t\}}{R_{max}} \tag{1}$$

According to equation (1), the value $\alpha i$ is equivalent to the ratio of the minimum distance (accounting for movement due to detected velocity) of the closest object in the set of detected objects divided by the maximum range $R_{max}$ of the radar system.

With the value $\alpha i$ determined for the current time interval i (i.e., $\alpha_i$), in step 212, in the next time interval (i.e., time interval i+1), the controller configures the radar system to transmit with a power signal level that is at least partially determined by the value $\alpha i$ as determined in step 210. The power reduction value can optionally be smoothened using a scalar beta value between the current and previous estimates of the power reduction value, e.g., via $\alpha_{i+1}=(1-\beta)\alpha_{i-1}+\beta\alpha_i$. In an embodiment, this involves configuring the radar system to transmit in the time interval i+1 at a power level determined according to the following equation:

$$P_{i+1} = P_{min} + \frac{P_{max}}{\alpha_i} \tag{2}$$

Within equation (2), $P_{min}$ represents the minimum power level of radar signals that can be transmitted by the radar system to ensure reliable object detection (even if not to the full range of the system) given a noisy environment. Accordingly, in step 212 the radar system is configured to transmit at a reduced power level that still enables monitoring of the object that is in closest proximity to the radar system.

Method 200 then returns to step 204 in which the radar system repeats step 204 for received reflection signals resulting from the radar signals transmitted in step 212.

With reference to method 200, in the event that the target object set is empty (e.g., no target objects are detected in the reflected signals), the power level $P_{i+1}$ is set to a maximum value. This resumes radar system operations at full power to increase the likelihood of the radar system detecting a target object.

Other circumstances may cause the radar system to resume full power operations. For example, if it is determined that the vehicle is significantly changing orientation (such that the radar system is presented with a brand-new scene) or the car is approaching a complex environment (e.g., an intersection), radar system operations at full power may resume.

Figures 3, 4:
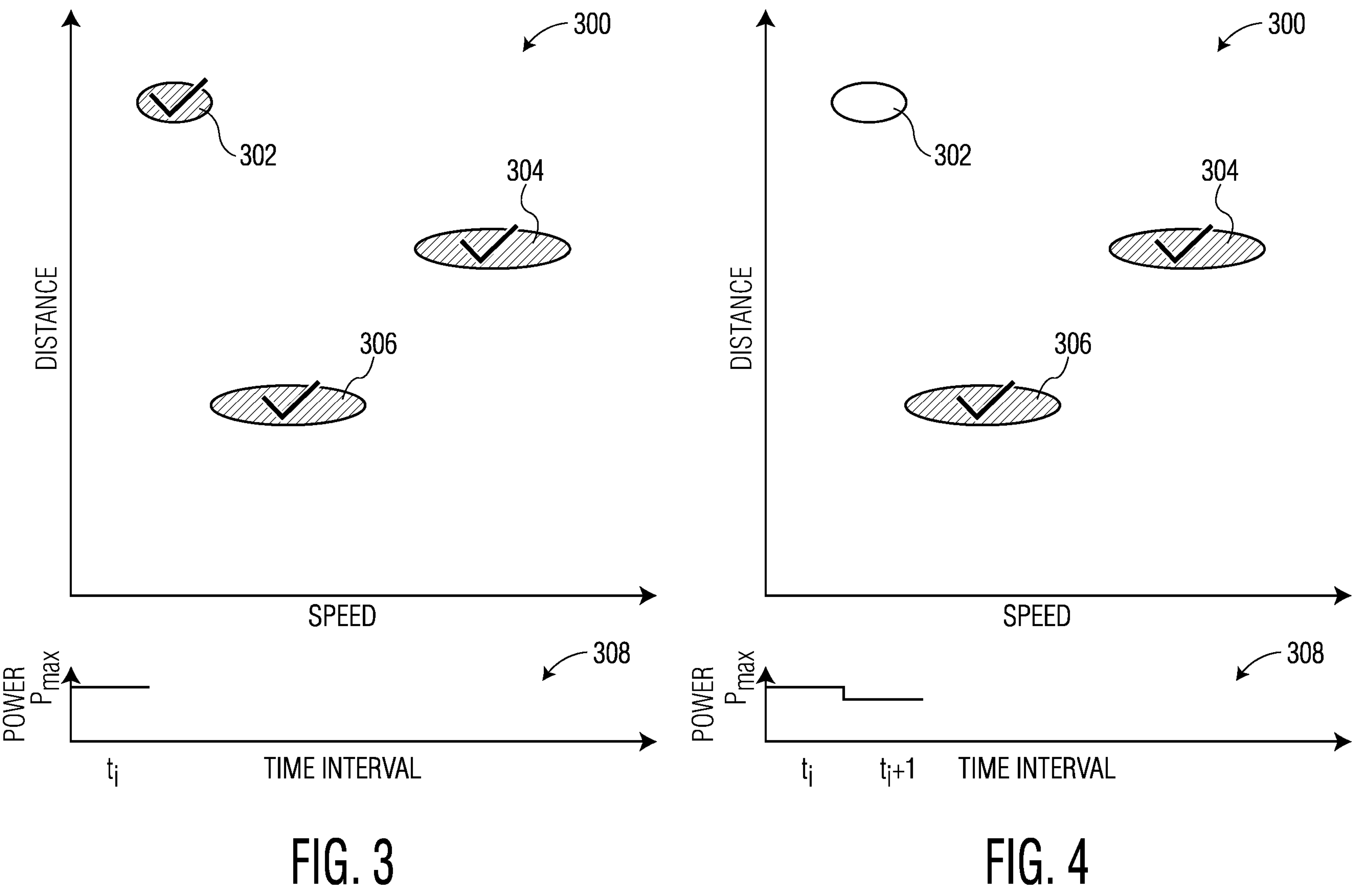
FIGS. 3-5 depict outputs of a radar system implementing the method of FIG. 2.

To illustrate the operation of method 200, FIG. 3 depicts an output of radar system during at an initial time $t_i$ as illustrated by scene 300. In scene 300, the vertical axis represents the distance to detected objects, while the horizontal axis represents the speed of those detected objects. As illustrated by scene 300, the radar system has detected three objects 302, 304, and 306. The three objects were detected by the radar system transmitting radar signals at initial time $t_i$ at full power ($P_{max}$) in accordance with step 202 of method 200. This maximum power level is depicted by graph 308. The vertical axis of graph 308 represents the power level of radar signals transmitted by the radar system while the horizontal axis represents time. As depicted by graph 308 in FIG. 3, the power level of transmitted radar signals at time $t_i$ is set to the maximum value $P_{max}$.

Reflected signals are then received and processed (e.g., in steps 204 and 206) to detect objects 302, 304, and 306. The distance and speed of the detected objects is then analyzed to determine the value $\alpha_i$ in accordance with equation (1) and step 210 of method 200.

The next time interval (i.e., $t_0+1$) is depicted in FIG. 4. In time interval $t_0+1$, the power level of the radar signal transmitted by the radar system is reduced in accordance with equation (2) in accordance with step 212 of method 200. That reduced power level is indicated by graph 308 in which the depicted power level is reduced in time interval $t_0+1$ as compared to the power level in time interval $t_i$. At the reduced power level, the radar system is only able to detect objects 304 and 306 in scene 300. Object 302 is no longer detected.

This process repeats in future time intervals. A new value $\alpha_{i+1}$ is determined in accordance with equation (1) based on the detected objects 304 and 306.

Figure 5:
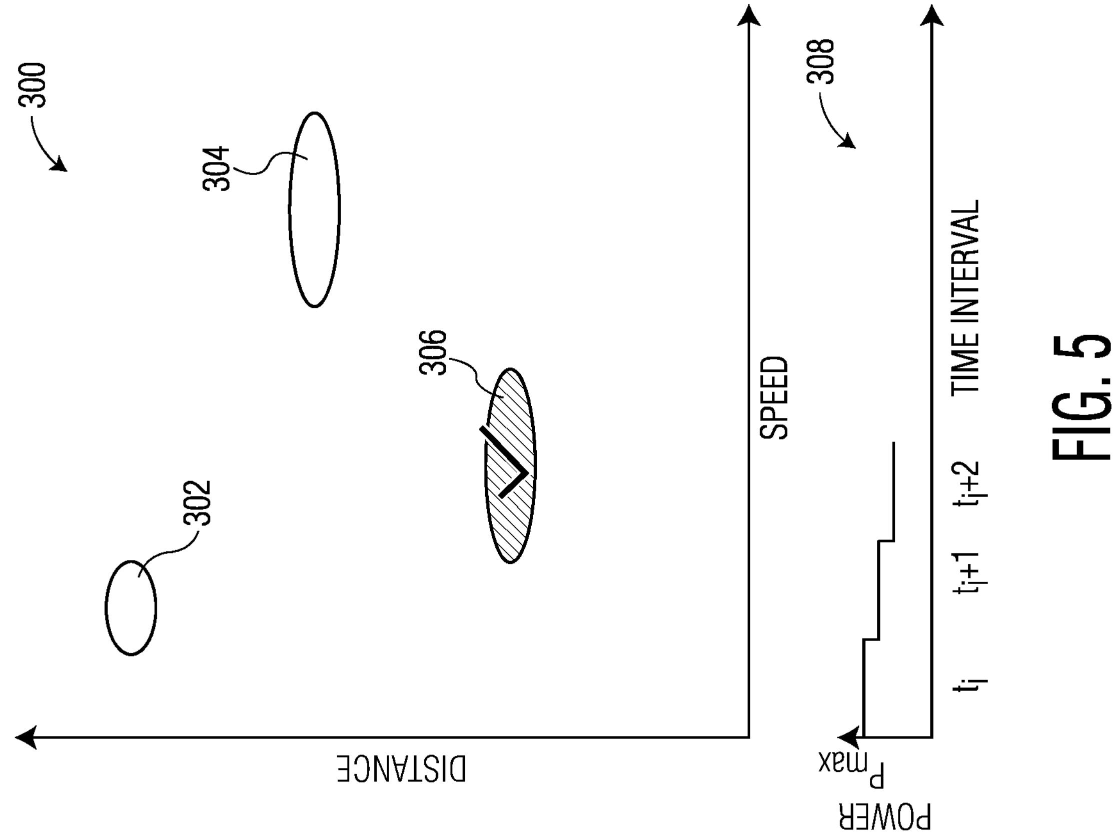

The next time interval (i.e., $t_0+2$) is depicted in FIG. 5. In time interval $t_0+2$, the power level of the radar signal transmitted by the radar system is reduced in accordance with equation (2) using the value $\alpha_{i+1}$. That reduced power level is indicated by graph 308 in which the depicted power level is reduced in time interval $t_i+2$ as compared to the power level in time interval $t_i+1$. At the reduced power level, the radar system is only able to detect object 306 in scene 300. Objects 302 and 304 are no longer detected. This process can repeat until either no target objects are detected (in which case the radar system resumes transmission of radar signals at the maximum power level $P_{max}$ until an object is detected) or the transmitted power level reaches some minimum power threshold ($P_{min}$).

Returning to FIG. 2, in some embodiments, method 200 may be further refined to account for the variable radar cross section (RCS) of target objects. Specifically, objects with smaller RCS tend to reflect radar signals at lower magnitude than other objects that may have a greater RCS. This can reduce the overall signal-to-noise ratio (SNR) of signals reflected by low RCS target objects as compared to the SNR of signals reflected by high RCS target objects. As such, it may be desirable to transmit radar signals towards objects with lower RCS at higher power levels than when transmitting radar signals towards target objects with higher RCS to increase the SNR in any reflected signal.

Although it is impractical to directly measure a target object's RCS, the SNR of a signal reflected from the object is a good indicator of an object's RCS. As such, the power levels of signals transmitted in accordance with method 200 described above, may be modified as a function of target SNR values or measured SNR values of received signals.

As such, the default power (e.g., $P_{max}$) can be selected as a function of the maximum detectable range of the radar system ($R_{max}$) and a predetermined minimum SNR value ($SNR_{min}$). That is $P_{max}$ may be defined according to the following expression:

$$P_{max} = f(R_{max}, SNR_{min}) \tag{3}$$

Equation (3) can be rewritten using relations provided by the radar question to:

$$P_{max} \sim SNR_{min} * R_{max}^4 \tag{4}$$

This relationship can be used to further modify equation (1) to determine a value of the power scaling factor α that accounts for the SNR of received reflection signals. That relationship is shown in the equation below:

$$\alpha_i = \left( \frac{\min_j \{R_j(t_i) - v_j(t_i)\Delta t\}^4 \cdot SNR_j}{R_{max}^4 \cdot SNR_{min}} \right)^{\frac{1}{4}} \tag{5}$$

Using equation 5 to calculate the power scaling factor α in different time intervals, method 200 can be implemented as illustrated in FIG. 2 to calculate the power scaling factor and determine a transmit power (e.g., via equation (2)) to be used by the radar system in an upcoming time slot. Using the SNR of reflected signals, equation (5) allows for higher-power radar signals to be transmitted when the SNR of the nearest target object is lower and for lower-powered radar signals to be transmitted when the SNR of the nearest target object is higher.

In another embodiment of the present system and method, a radar system may include multiple transmit and receive antennas that are configured to use combinations of transmitted and received radar signals to cover distinct regions or sectors of interest. Such a radar system may be configured in accordance with automotive radar system 100 of FIG. 1, in which the radar system 100 includes two or more transmitting antenna elements TXi and receiving antenna elements RXj connected, respectively, to one or more radio frequency (RF) transmitter (TX) units 11 and receiver (RX) units 12.

The power control method 200 of FIG. 2 can be adapted to be used in conjunction with a radar system with multiple transmitters and receivers. Specifically, method 200 may be modified to enable transmit power control for signals transmitted into a number of angular regions or sectors that are within the radar system's FOV. For example, a multi-transmitter/receiver radar system may be configured to scan a region of interest that includes k sectors. Using beamforming, the radar system iteratively transmits radar signals into the k scanning regions enabling the radar system to detect objects that may be present within each k scanning regions. At any particular time, the radar system may be configured to scan only a single sector. Consequently, the radar signals that are transmitted to execute scans of different sectors can be transmitted at different power levels, so that different power levels can be used for each scanning sector.

Figure 6:
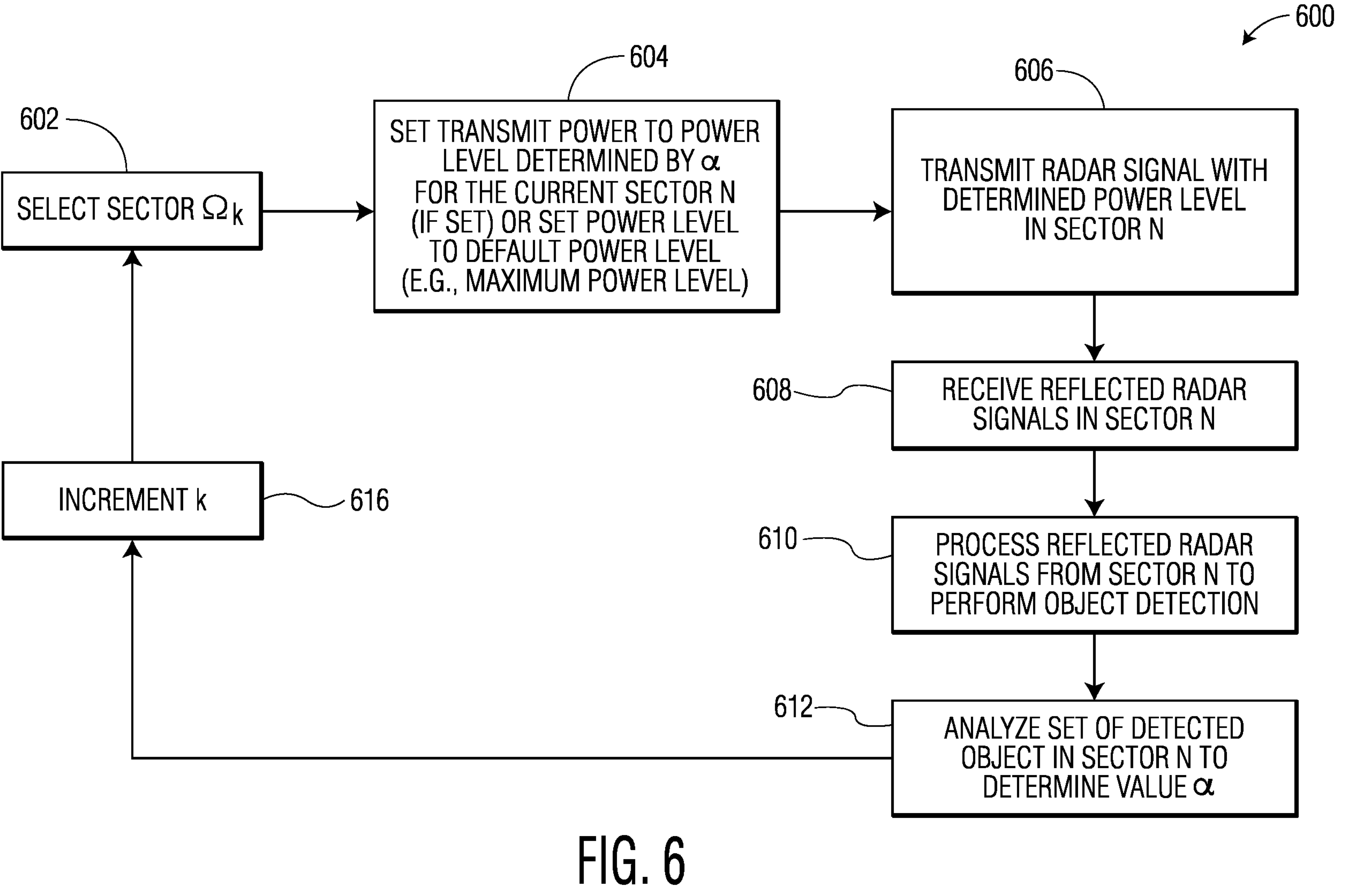
FIG. 6 depicts a method that may be implemented by a controller of a radar system configured to transmit a radar signal into one of N sectors (Ω) to provide adaptive power control of the radar system's signal transmitter by using beam steering.

FIG. 6 depicts a method 600 that may be implemented by a controller of a radar system configured to transmit a radar signal into one of N sectors (Ω) to provide adaptive power control of the radar system's signal transmitter (e.g., one or more radio frequency (RF) transmitter (TX) units 11 of FIG. 1).

In step 602, a first sector $\Omega_k$ of the total number of sectors N is selected. In step 604, the controller determines a power level at which radar signals are to be transmitted into the current sector $\Omega_k$. As such, the controller determines whether the value $\alpha_k$ has been previously determined for the current sector $\Omega_k$ (e.g., as a result of a prior iteration of method 600). If so, the power level is set to a value determined by the value ok (e.g., in accordance with equation (2)). Alternatively, if the value $\alpha_k$ has not been set for the current sector $\Omega_k$, the power level is set to a default power level. In most applications, the default power level will be a maximum power level (i.e., $P_{max}$) at which the radar system is allowed to transmit radar signals. This is the radar system's default behavior because, by transmitting at maximum power $P_{max}$, the radar system is configured to detect objects that are with the radar system's maximum range $R_{max}$.

In step 606, radar signals are transmitted by the radar system into sector $\Omega_k$ at the power level determined in step 604. In step 608, signals that include reflections of the radar signals transmitted in step 202 are received by the radar system (e.g., via one or more radio frequency (RF) receiver (RX) units 12) from sector N. In step 610, those reflected signals are processed (e.g., via a sequence of Fourier transforms and other analysis) to identify a set of target objects from which the signals reflected. For each target object, a range and velocity are determined for the current sector $\Omega_k$. As such, in step 610 a data set is determined that includes K objects where each object is associated with a range, velocity, azimuth angle, and elevation angle value $R_K$, $V_K$, and $\theta_K$, and $\phi_K$.

In step 612, the set of K objects identified in step 206 is further analyzed to determine the value $\alpha_k$ that is used to modulate the power level of signals transmitted by the radar system for later transmissions. Specifically, in step 208, the controller is configured to determine the value α for the current timeslot i and in the current sector $\Omega_k$ using the following equation:

$$\alpha_i(\Omega_k) = \left( \frac{\min_{j,\theta \in \Omega_k} \{R_j(t_i) - v_j(t_i)\Delta t\}^4 \cdot SNR_j}{R_{max}^4 \cdot SNR_{min}} \right)^{\frac{1}{4}} \tag{6}$$

In equation (6), Δt represents the duration of the time intervals in which the radar system is configured to transmit a radar signal into the current sector $\Omega_k$. According to equation (6), the value $\alpha_i(\Omega_k)$ is equivalent to the ratio of the minimum distance (accounting for movement due to detected velocity) of the closest object in the set of detected objects in the current sector $\Omega_k$ divided by the maximum range $R_{max}$ of the radar system. While equation (6) describes the scaling within an angular sector in the azimuth domain, it should be noted that the same can be extended to the elevation domain.

With the value $\alpha_i(\Omega_k)$ determined for the current time interval i and the current sector $\Omega_k$, the method moves to step in step 616 in which the counter k is incremented to select the next sector $\Omega_k$+1. The method then moves to step 602 and repeats for the next (and subsequent) sectors Ω. When all sectors have been processed in the manner the method repeats by incrementing again through all potential sectors Ω.

With reference to method 600, in the event that the target object set for a particular sector is empty (e.g., no target objects are detected in the reflected signals of that sector), the power level for later signal transmissions in that sector (i.e., $P_{i+1}$) is set to a maximum value. This resumes radar system operations at full power to increase the likelihood of the radar system detecting a target object.

In summary, method 600 is arranged to let a radar system sequentially transmit radar signals into different sectors, for a radar system configured with multiple scanning regions. Based upon target objects detected in the various sectors, the power level of signals transmitted into each signal can be fine-tuned (e.g., via the power scaling factor α) for each sector so as to transmit at a minimal power level that enables monitoring of nearby target objects. The benefit of this approach is that it can, in turn, reduce interference with other radar systems in the vicinity.

The method of FIG. 6 provides a number of benefits including a radar system's ability to reduce transmit power of signals into various sectors of the radar system's FOV. For example, if an automobile is traveling along a roadway in which a guard-rail or other structure run along the side of the vehicle, the radar system will transmit radar signals into that FOV sector at a significant reduced power level as the guard-rail will be nearby the vehicle, such that a low power radar signal is able to monitor distance to that guard rail. By reducing the power of signals transmitted at the guard-rail (or other nearby target object), the risk that ghost target objects are detected by the radar system is reduced.

In some embodiments of the present system, to the extent a controller of the radar system is notified (e.g., via out-of-band signaling) that another radar system is operating in the vicinity of the radar system, the radar system may be configured to reduce transmit power of radar signals being transmitted into the radar system FOV sector that includes the other radar system.

In some aspects, the techniques described herein relate to a radar system, including: at least one transmitter and at least one receiver, wherein the at least one transmitter and the at least one receiver are configured to transmit and receive radar signals; and an radar processor, configured to: transmit, at a first time, a first radar signal at a first power level, wherein the first power level is a maximum power level of signals transmitted by the automotive radar system, receive, using the at least one receiver, a first received signal, process the first received signal to identify a plurality of target objects, wherein each target object in the plurality of target objects is associated with a distance value and a velocity value, determine a power reduction factor using the distance value and the velocity value associated with each target object of the plurality of target objects, and transmit, at a second time after the first time, a second radar signal at a second power level, wherein the second power level is at least partially determined by the power reduction factor and the second power level is less than the first power level.

In some aspects, the techniques described herein relate to a system, including: a transmitter; a receiver; and a processor, configured to: transmit, using the transmitter, a first radar signal at a first power level, process a first reflection signal received by the receiver to identify a plurality of target objects, determine a first power reduction factor using the plurality of target objects, wherein the first power reduction factor is associated with a first angular beam steering direction; determine a second power reduction factor using the plurality of target objects, wherein the first power reduction factor is associated with a second angular beam steering direction; transmit, using the transmitter, a second radar signal at a second power level in the first angular direction, wherein the second power level is at least partially determined by the first power reduction factor; and transmit, using the transmitter, a third radar signal at a third power level in the second angular direction, wherein the third power level is at least partially determined by the second power reduction factor.

In some aspects, the techniques described herein relate to a method, including: determining a plurality of target objects, wherein each target object in the plurality of target objects is associated with a distance value and a velocity value, determining a power reduction factor using the distance value and the velocity value associated with each target object of the plurality of target objects; and transmitting a second radar signal at a second power level determined by the power reduction factor.

Although the examples have been described with reference to automotive radar systems, the systems and methods described herein may be implemented in conjunction with other types of radar systems.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A radar system comprising:

at least one transmitter and at least one receiver, wherein the at least one transmitter and the at least one receiver are configured to transmit and receive radar signals; and a radar processor configured to:

transmit, at a first time, a first radar signal at a first power level, wherein the first power level is a maximum power level of signals transmitted by the radar system, receive, using the at least one receiver, a first received signal, process the first received signal to identify a plurality of target objects, wherein each target object in the plurality of target objects is associated with a distance value and a velocity value, determine a power reduction factor that is proportional to a maximum range value of the radar system using the distance value and the velocity value associated with at least one target object of the plurality of target objects, and transmit, at a second time after the first time, a second radar signal at a second power level, wherein the second power level is at least partially determined by the power reduction factor and the second power level is less than the first power level.

2. The radar system of claim 1, wherein the at least one target object comprises a first target object associated with a minimum distance value out of the distance values associated with each of the plurality of target objects.

3. The radar system of claim 1, wherein:

the radar processor is configured to control the at least one transmitter to transmit radar signals at time intervals designated $\Delta t$;

the power reduction factor is determined by determining a location value for each target object of the plurality of target objects; and the location value of each target object is equal to the distance value associated with the target object minus the velocity value associated with the target object multiplied by $\Delta t$.

4. The radar system of claim 3, wherein the power reduction factor is equal to a minimum location value of the location values associated with the target objects of the plurality of target objects divided by the maximum range value of the radar system.

5. The radar system of claim 1, wherein the radar processor is configured to determine the second power level according to the expression $$P_{min} + \frac{P_{max}}{\alpha},$$

where $P_{min}$ is a minimum power level of signals transmitted by the radar system, $P_{max}$ is the maximum power level, and a is equal to the power reduction factor.

6. The radar system of claim 5, wherein the distance value and the velocity value associated with each target object of the plurality of target objects is determined by processing the first received signal.

7. The radar system of claim 1, wherein the power reduction factor is at least partially determined by a signal-to-noise value associated with a target object of the plurality of target objects.

8. A system comprising:

a transmitter;

a receiver; and a processor configured to:

transmit, using the transmitter, a first radar signal at a first power level, process a first reflection signal received by the receiver to identify a plurality of target objects, determine a first power reduction factor proportional to a maximum range of the system using first data related to at least one of the plurality of target objects, wherein the first power reduction factor is associated with a first angular beam steering direction;

determine a second power reduction factor proportional to the maximum range value of the system using second data related to a second at least one of the plurality of target objects, wherein the first second power reduction factor is associated with a second angular beam steering direction;

transmit, using the transmitter, a second radar signal at a second power level in the first angular direction, wherein the second power level is at least partially determined by the first power reduction factor; and transmit, using the transmitter, a third radar signal at a third power level in the second angular direction, wherein the third power level is at least partially determined by the second power reduction factor.

9. The system of claim 8, wherein at least one of the first power reduction factor and the second power reduction factor is determined by determining a distance value to each one of the target objects in the plurality of target objects.

10. The system of claim 9, wherein the transmitter, the receiver, and the processor of the system are part of an automotive radar system; and the first power reduction factor is equal to a minimum distance value of the distance values associated with the target objects of the plurality of target objects in the first angular direction divided by the maximum range value of the system.

11. The system of claim 8, wherein:

the transmitter, the receiver, and the processor of the system are part of an automotive radar system; and the processor is configured to determine the second power level according to the expression $$P_{min} + \frac{P_{max}}{\alpha},$$

where $P_{min}$ is a minimum power level of signals transmitted by the automotive radar system, and $P_{max}$ is a maximum power level of signals transmitted by the automotive radar system, and α is equal to the first power reduction factor.

12. The system of claim 11, wherein the value $P_{max}$ is at least partially determined by a signal-to-noise ratio of the first reflection signal.

13. The system of claim 8, wherein the processor is configured to:

process a second reflection signal to determine that the second reflection signal is not indicative of any target objects; and transmit a fourth radar signal at a fourth power level equal to a maximum power level of signals transmitted by the transmitter.

14. A method comprising:

determining a plurality of target objects by an automotive radar system, wherein each target object in the plurality of target objects is associated with a distance value and a velocity value, determining a power reduction factor proportional to a maximum range value of the automotive radar system using the distance value and the velocity value associated with each target object of the plurality of target objects; and transmitting a second radar signal at a second power level determined by the power reduction factor.

15. The method of claim 14, further comprising determining the power reduction factor by at least determining a first target object associated with a minimum distance value out of the distance values associated with each of the plurality of target objects.

16. The method of claim 14, wherein:

the radar system is configured to transmit radar signals at time intervals designated Δt; and the method further comprising:

determining the power reduction factor by determining a location value for each target object of the plurality of target objects; and wherein the location value of each target object is equal to the distance value associated with the target object minus the velocity value associated with the target object multiplied by Δt.

17. The method of claim 16, further comprising determining the power reduction factor is equal to a minimum location value of the location values associated with the target objects of the plurality of target objects divided by the maximum range value of the automotive radar system.

18. The method of claim 14, further comprising determining the second power level according to the expression $$P_{min} + \frac{P_{max}}{\alpha},$$

where $P_{min}$ is a minimum power level of signals transmitted by the automotive radar system, $P_{max}$ is a maximum power level of signals transmitted by the automotive radar system, and a is equal to the power reduction factor.

19. The method of claim 18, further comprising determining the value $P_{max}$ is at least partially determined by a signal-to-noise ratio in a signal received by the automotive radar system.

20. The method of claim 14, further comprising determining the distance values and the velocity values associated with the plurality of target objects by performing at least one of:

processing a radar reflection signal to determine the distance values and the velocity values; or retrieving the distance values and the velocity values from a database.

* * * * *